Jan. 20, 1959  O. M. ALLISON  2,869,146
AUTOMOBILE SEAT ATTACHMENT FOR DOGS
Filed Jan. 3, 1958
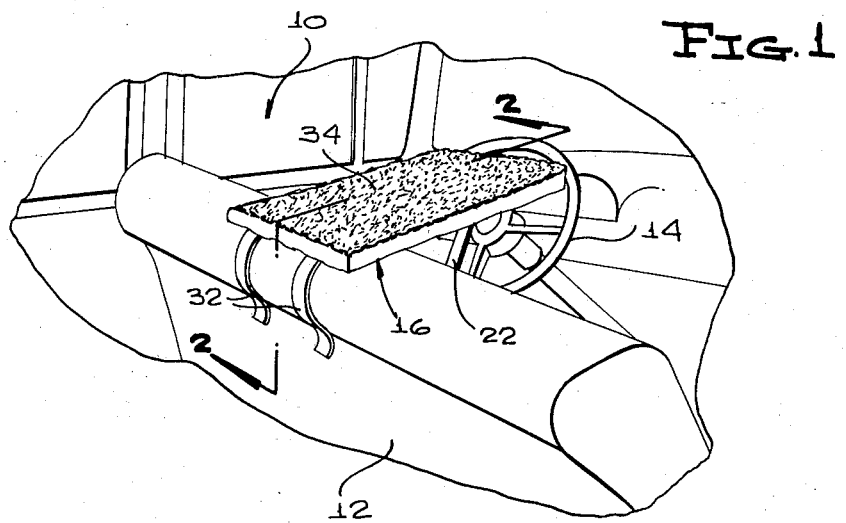
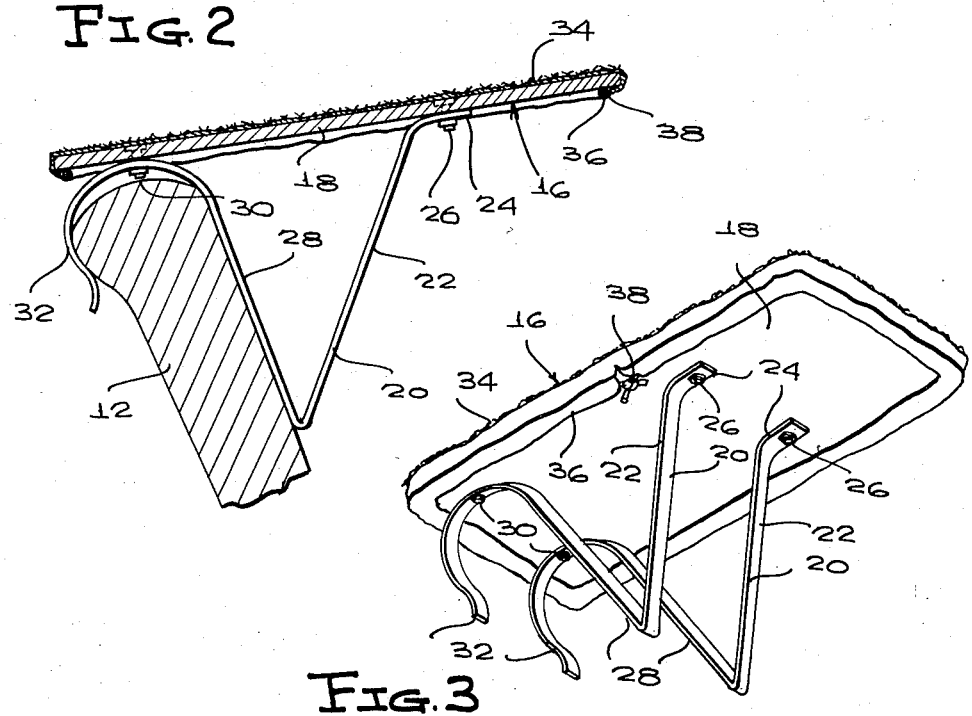
INVENTOR.
OLLIE M. ALLISON
BY
McMorrow, Berman & Davidson
ATTORNEYS

United States Patent Office 2,869,146
Patented Jan. 20, 1959

2,869,146

AUTOMOBILE SEAT ATTACHMENT FOR DOGS

Ollie M. Allison, Colton, Calif.

Application January 3, 1958, Serial No. 707,022

1 Claim. (Cl. 5—118)

This invention relates to attachments for automobiles, and more particularly has reference to a seat attachment that is designed to provide a ledge, seat, or similar support for a dog while the dog is riding in an automobile.

It is well known that dogs take considerable pleasure in riding in automobiles, and usually, the dog desires to be as high as possible, so as to be able to observe the passing scene and feel the effect of the wind currents passing the vehicle. As a result, many dogs have to perch upon the back of the front seat of the vehicle, but this of course is a rather hazardous position for the dog to assume. Still further, sometimes the dog places his paws upon the window molding, and leans out of the window.

The present invention aims to provide a support for a dog which will permit the dog to be comfortably supported either in a sitting or lying position, at a relatively high elevation, where the dog will be comfortable and yet able to observe the passing scenery.

Another object is to provide a seat of the character described that will be inexpensively constructed, will be attachable swiftly and easily to any conventional automobile seat, and will not damage the automobile seat in any way.

Another object of importance is to provide a seat for dogs, which will be so designed as to provide a particularly effectively balanced support, designed to insure maximum stability while still keeping the cost of the device at a very low figure.

Another object of importance is to provide an automobile seat attachment for dogs, wherein the support board or plate will be held in position merely through the use of two novelly shaped support bars, said bars being designed to provide a proper distribution of the weight of the dog relative to the seat supporting the device, while at the same time assuring a braced support of the device upon the automobile seat.

Other objects will appear from the following description, the claim appended thereto, and from the annexed drawing, in which like reference characters designate like parts throughout the several views, and wherein:

Figure 1 is a perspective view of the device as seen from the rear, the device being shown in position upon an automobile seat, the automobile being illustrated only fragmentarily;

Figure 2 is a longitudinal sectional view through the device in position, on an enlarged scale; and Figure 3 is an enlarged, bottom perspective view of the device per se.

Referring to the drawing in detail, the device is mounted within a conventional automobile generally designated 10, having the usual front seat 12. The device has been shown in position centrally disposed upon the back portion of the automobile seat, that is, laterally of the steering wheel 14, so that the dog may be supported close to the driver. Of course, the device can be positioned anywhere that one may desire upon the seat 12.

In any event, the device has been generally designated at 16, and includes a rectangular, planiform support plate 18 which may be formed of plywood, metal, or the like.

The support plate 18 is fixedly secured to mounting bars 20, transversely aligned as shown in Figure 3 and secured to the underside of the plate 18. Bars 20 are of identical formation, each being formed from a single length of flat, rigid bar stock bent to shape to include inclined forward end portions 22, constituting brace bars, said forward edge portions being inclined in a direction forwardly upwardly from their rear ends, and being integral at their upper, forward ends with forwardly projecting ears 24 in face-to-face contact with the underside of the plate 18, at a location spaced forwardly a short distance from the midlength portion of said plate 18. Formed in the ears 24 are openings receiving connecting bolts 26, nuts being threaded upon the bolts to fixedly connect the ears 24 to the outer side of the plate 18.

The forward end portions 22 are integral, at their rear, lower ends, with upwardly, rearwardly inclined intermediate portions 28. Intermediate portions 28 and forward end portions 22 thus define V-shaped portions of the respective bars 20.

Intermediate portions 28 at their rear, upper ends curve rearwardly into contact with the underside of the plate 18, and at this location are secured by bolts 30 to the plate. The respective bars 20 are formed with rear end portions 32 which are curved, opening in a downward direction and being curved through substantially 180°, said rear end portions 32 being adapted to fit over the top of a seat back as shown in Figures 1 and 2. There can be a slight springiness to the bars 20, to permit the arcuate portions 32 to be spread slightly when fitted onto the seat back, thus to provide a sure grip of the device upon the seat back.

Since the seat back usually has an overhang along its back surface, the device is securely engaged with the same. However, it will securely engage, also, a seat back not having said overhang.

As will be noted, the weight of the dog is concentrated mainly forwardly of the seat-straddling portion 32. The weight, exerted downwardly, is transmitted directly through the bracing portions 22 to the lower ends of the brace portions 22, directly against the front of the seat. As a result, a very strong, braced support device upon the seat is provided, with the plate 18 inclining slightly in a forward direction with its leading edge slightly higher than its trailing edge. The dog may be seated upon the plate 18, or alternatively may comfortably lie down thereon, in position where he can observe all that is going on about him.

The device, as will be apparent, can be swiftly and easily attached to or detached from a conventional automobile seat. When in use, it provides an effective support for the dog, that will keep the dog off the upholstery. Further, the dog will not tend to lean dangerously out of the window. The device, of course, is covered with a suitable material, as for example a soft chenille covering piece 34, the marginal portion 36 of which is turned under the edges of the plate 18, and is hemmed to receive a drawstring 38.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted with the scope of the appended claim.

What is claimed is:

In combination with a back rest of an automotive vehicle seat structure, which back rest has a front and back wall and a top wall; an animal support attachment for dogs and other quadruped pets comprising a support plate having a flat upper surface having a removable friction covering superimposed thereon and on which an animal can sit or stand, said support plate having a bottom surface and having a front and a rear end, a pair of one-piece unitary mounting bars secured to the bottom surface of the plate and depending therefrom in parallel longitudinally extending and laterally spaced-apart relation, each of said mounting bars including a straight first leg portion having an upper end secured to the bottom surface of the plate adjacent to and spaced rearwardly from the front end of the plate, said leg portion extending downwardly and rearwardly from the plate, a second leg portion integral with the lower end of the first leg portion and extending upwardly and rearwardly therefrom and being disposed at an acute angle thereto, said second leg portion having a flat rear face resting against the front wall of the back rest and extending upwardly toward the top wall and terminating at the top wall, an arcuate hook portion integral with the upper end of the second leg portion and removably fitted over the top wall of the back rest and extending down over the upper end of the back wall of the back rest, said hook portion being fastened intermediate its ends to the bottom surface of the plate adjacent the rear end thereof, and locating the rear end portion of the plate directly above the top wall with the edge of the rear end being disposed substantially above the rear wall of the back rest, said first leg portion of the bars being longer in length than the second leg portion and supporting the plate at an angle inclined from the horizontal and extending upwardly and forwardly of the back rest with the major portion of the plate projecting beyond the front wall of the back rest.

References Cited in the file of this patent

UNITED STATES PATENTS

| | | |
|---|---|---|
| 1,340,015 | Claflin | May 11, 1920 |
| 1,429,390 | Williams | Sept. 19, 1922 |
| 1,912,514 | Curtis et al. | June 6, 1933 |
| 2,433,090 | Cass | Dec. 23, 1947 |
| 2,499,103 | Love | Feb. 28, 1950 |
| 2,687,336 | Smith et al. | Aug. 24, 1954 |